United States Patent
Parikh et al.

(10) Patent No.: US 8,732,010 B1
(45) Date of Patent: May 20, 2014

(54) ANNOTATED ADVERTISEMENTS AND ADVERTISEMENT MICROSITES

(75) Inventors: Jignashu Parikh, San Jose, CA (US); Chrix Erik Finne, San Francisco, CA (US); Surojit Chatterjee, Fremont, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/216,800

(22) Filed: Aug. 24, 2011

(51) Int. Cl.
*G06Q 30/00* (2012.01)
*G06Q 90/00* (2006.01)

(52) U.S. Cl.
CPC .................................... *G06Q 90/00* (2013.01)
USPC ........................................................ 705/14.1

(58) Field of Classification Search
CPC .................................................... G06Q 90/00
USPC ........................................................ 705/14.1
See application file for complete search history.

(56) References Cited

U.S. PATENT DOCUMENTS

| | | | |
|---|---|---|---|
| 7,873,710 B2 * | 1/2011 | Kiley et al. | 709/220 |
| 2005/0065806 A1 | 3/2005 | Harik | |
| 2007/0112656 A1 | 5/2007 | Howe et al. | |
| 2007/0136657 A1 | 6/2007 | Blumenthal et al. | |
| 2009/0247140 A1 | 10/2009 | Gupta et al. | |
| 2009/0296686 A1 | 12/2009 | Pirani et al. | |

* cited by examiner

*Primary Examiner* — Daniel Lastra
(74) *Attorney, Agent, or Firm* — Johnson, Marcou & Isaacs, LLC (57) ABSTRACT

An advertisement distribution system can generate advertisement creatives having annotations and advertisement microsites using content extracted from landing web page documents. An advertisement module of the advertisement distribution system can analyze landing pages and other documents to identify relevant information, such as a phone number for a click-to-call annotation, an address for a merchant, and additional product information. The advertisement module can automatically generate the advertisement creatives and/or microsites using the extracted content. The microsite can include less data intensive content than the landing page and be linked to the advertisement creative. In this way, the less data intensive microsite can be downloaded and displayed in response to a user selecting the advertisement creative rather than downloading the landing page. This supports quicker advertisement browsing and is especially useful for serving advertisements on wireless devices having slower download speeds.

25 Claims, 6 Drawing Sheets

ANNOTATED ADVERTISEMENTS AND ADVERTISEMENT MICROSITES

TECHNICAL FIELD

The present disclosure relates generally to advertising and, more specifically, to generating advertisement microsites and advertisement creatives having annotations using information obtained from advertisers' web page documents.

BACKGROUND

Online advertising has become an increasingly popular means for advertising products and services. Generally, an online advertisement is displayed by a website in the form of an advertisement creative. The advertisement creatives include certain types of information regarding a product or service subject to the advertisement. For example, an advertisement creative may include a title of a product, a description of the product, a promotional offer, and/or information regarding a merchant that offers the product.

The advertisement creatives typically include a link to a landing web page associated with the advertisement such that, when the advertisement creative is selected, that landing page is presented to the user. For example, an advertisement creative for a merchant that sells televisions may include a link to that merchant's web site. If the advertisement is for a specific product, the landing page may be a web page having content directed to that specific product. These landing pages often include images and other content that require the transmission of a significant amount of data from the advertiser to the user's network device.

Since the advent of the mobile web, users are increasingly using mobile devices, such as smartphones, to access the Internet. Such access typically involves slower data transmission rates and thus, an increased amount of time to download a web page document such as an advertisement landing page. Often, users may consider selecting an advertisement but decline to in view of the time required to download the landing page. Thus, it is desirable to present additional information related to an advertisement prior to downloading an entire landing page.

SUMMARY

In certain exemplary embodiments, a method for presenting advertisement content includes a computer storing an advertisement. The advertisement includes a landing page link that causes a landing page associated with the advertisement to be presented upon selection of the advertisement. The landing page includes content related to the advertisement. A microsite is created based on information extracted from the landing page. The landing page link is modified such that selection of the advertisement causes the microsite to be presented. The computer transmits the advertisement for presentation. The computer receives an indication that the advertisement has been selected. In response to receiving the indication that the advertisement has been selected, the computer transmits the microsite for presentation.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

The methods and systems described herein enable advertisement providers to annotate advertisement creatives with information obtained from advertisement landing pages, other web page documents associated with an advertiser, and/or other information sources. These annotations may include, among other things, information associated with the advertiser, such as a phone number for the advertiser, a click-to-call feature that allows a user to dial the phone number for the advertiser simply by selecting the phone number, and an address for a location of the advertiser. The annotations also can include information associated with the product or service subject to the advertisement creative, such as pricing information, product model number, and product review information. As used throughout this specification, the term "product" should be interpreted to include tangible and intangible products, as well as services. Additionally, for simplicity, manufacturers, retailers, and others that sell products or services are interchangeably referred to herein as "merchants."

The methods and systems also enable the advertisement providers to create advertisement microsites that may be displayed in response to a user selecting an advertisement creative rather than navigating to an advertisement landing page of the advertisement. The microsite typically includes additional information associated with the advertisement (in addition to the information provided by the advertisement creative) that can be considered by the user before determining whether to proceed to the landing page. For example, a microsite may include an image of a product, pricing information, a promotional offer, and/or additional content related to the product or the advertiser of the product. Typically, the microsite is a web page document that includes less content than the advertisement landing page to support quicker download times. The microsite also can include a link or icon that, when selected, causes the advertisement landing page associated with the advertisement creative to be displayed. In this way, users can review additional information regarding the advertisement before deciding whether to download the advertisement landing page. This enables users to more quickly review advertisements to determine whether an advertisement provides information or a product relevant to the user. If the advertisement is not of interest to the end user, then the end user does not have to waste time downloading a landing page and then navigating back to the previous web page. This is very beneficial to wireless device users that frequently experience slower download rates as compared to devices connected via wired broadband. In addition, the advertisement landing page may be downloaded, for example after the microsite is downloaded, so that the landing page can be displayed more quickly if the user chooses to view the landing page.

The annotations and microsites can be automatically generated using the information obtained from advertisement landing pages, other web page documents associated with an advertiser, and/or other information sources. In one embodiment, an advertisement module implemented in hardware and/or software analyses the information to identify and extract relevant information, such as phone numbers, addresses, model numbers, pricing information, and other product or advertiser information. The advertisement module may then add the extracted information as annotations to an advertisement creative and/or to a microsite for the advertisement.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

Figure 1:
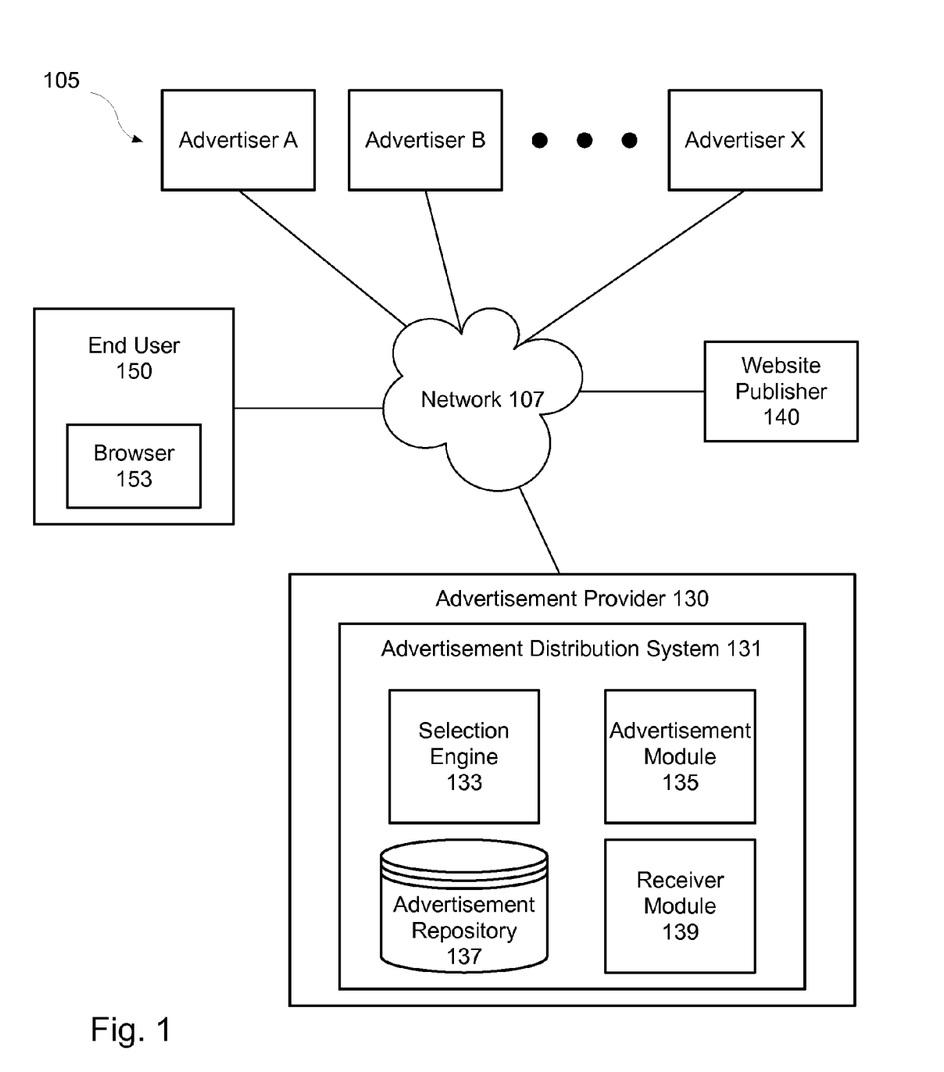
FIG. 1 depicts a system for serving advertisements, in accordance with certain exemplary embodiments.

FIG. 1 depicts a system 100 for serving advertisements, in accordance with certain exemplary embodiments. As depicted in FIG. 1, the system 100 includes network devices 105, 130, 140, and 150 that are configured to communicate with one another via one or networks 107. Each network 107 includes a wired or wireless telecommunication means by which network devices (including devices 105, 130, 140, 150) can exchange data. For example, the network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 130, 140, 150 includes a device capable of transmitting and receiving data over the network 107. For example, each network device 105, 130, 140, 150 can include a server, desktop computer, laptop computer, smartphone, handheld computer, tablet computer, personal digital assistant ("PDA"), or any other wired or wireless, processor-driven device. In the exemplary embodiment depicted in FIG. 1, the network devices 105, 130, 140, 150 are operated by advertisers, an advertisement provider, a website publisher, and end users, respectively.

The end user network devices 150 each include a browser application module 153, such as Microsoft Internet Explorer, Firefox, Netscape, Google Chrome, or another suitable application for interacting with web page files maintained by the website publisher 140, the advertisement provider 130, the advertisers 105, and/or other network devices. The web page files can include text, graphic, images, sound, video, and other multimedia or data files that can be transmitted via the network 107. For example, the web page files can include one or more files in the HyperText Markup Language ("HTML"). The browser application module 153 can receive web page files from the website publisher 140 or other network devices and can display the web pages to an end user operating the end user network device 150.

In certain exemplary embodiments, the web pages files include content maintained by the website publisher 140 and advertisements maintained by an advertisement distribution system 131 of the advertisement provider 130. For example, the website publisher 140 may include one or more advertisements on web pages published by the website publisher 140. The website publisher 140 may request advertisements from the advertisement provider 130 to include with the web pages, for example based on the content of the web pages.

In certain exemplary embodiments, the advertisement provider 130 may be associated with or include an Internet search engine, such as a product search web site (not shown). The Internet search engine may receive queries and provide search results in response to the queries in the form of web page documents. Along with the search results, the Internet search engine may provide advertisements that are displayed via the web page documents.

In certain exemplary embodiments, the end user network devices 150 include one or more application modules in addition to or in place of the browser application module 153. For example, the end user network devices 150 may include gaming applications, productivity applications, shopping applications, and/or social networking applications that display content via mechanisms other than web page files. The advertisement provider 130 may provide advertisements that are displayed by these applications. For example, an application provider that provides the application modules and facilitates the use of the application modules may request advertisements from the advertisement provider 130 and transmit those advertisements to the end user network devices 150 for display via the application modules.

The advertisers 105 provide advertisements or information regarding products that the advertiser 105 would like to advertise to the advertiser provider 130. The advertisers 105 can be merchants, retailers, wholesalers, service providers, nonprofit organizations, individuals, or any other entity that would like to advertise a product, service, event, or other item. The advertisers 105 also maintain advertisement landing pages that are linked to their respective advertisements. For example, each advertisement creative maintained by the advertisement provider 130 may include a web link, such as a Uniform Resource Locator ("URL"), to the advertisement's landing page. The landing pages typically include more information regarding the product being advertised and/or the advertiser 105. The landing pages also may enable the end users 150 to purchase the advertised product.

Conventionally, when an advertisement creative is selected, the web link causes the browser application module 153 to navigate to the landing page for that advertisement. In certain exemplary embodiments, the advertisement distribution system 131 generates and maintains microsites that are displayed in response to an advertisement being selected rather than (or in addition to) displaying the landing page. The advertisement distribution system 131 also annotates advertisement creatives and microsites with information obtained from the respective landing pages and/or other information sources. The advertisement distribution system 131 is described in more detail hereinafter with reference to the method illustrated in FIG. 2.

System Process

Figure 2:
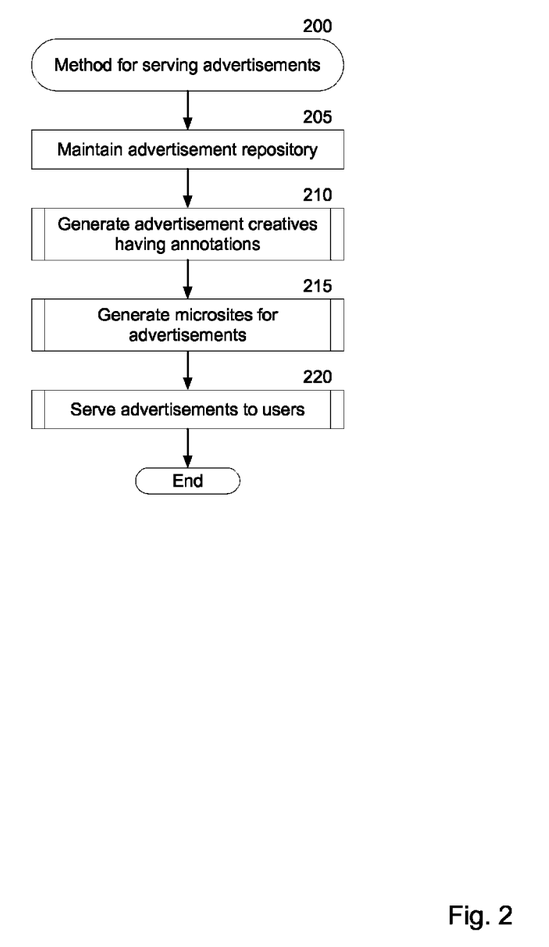
FIG. 2 is a block flow diagram depicting a method for serving advertisements, in accordance with certain exemplary embodiments.

FIG. 2 is a block flow diagram depicting a method 200 for serving advertisements, in accordance with certain exemplary embodiments. The method 200 is described with reference to the components illustrated in FIG. 1.

In block 205, the advertisement distribution system 131 maintains the advertisements in the advertisement repository 137. The advertisement repository 137 includes a data structure, such as one or more databases and/or electronic records, that stores advertisement creatives. Additionally, or in the alternative, the advertisement repository 137 stores advertisement information and content that can be used to generate advertisement creatives. This information and content can include, for each advertisement, a product title product description, product identifier, one or more images, one or more videos, product review or rating information, merchant name, merchant identifier, pricing information, promotional offer information, and/or any other content suitable for being presented by an advertisement creative. For example, the advertisement creatives may be in the form of templates for displaying certain content, such as a product title, a product description, and a promotional offer. The advertisement distribution system 131 may transmit the template and the content appropriate for populating the template in response to a query or request for advertisements.

In certain exemplary embodiments, a receiver module 139 of the advertisement distribution system 131 receives information, content, and/or advertisement creatives that are included in the advertisement repository 137 in electronic feeds provided by one or more advertisers 105. For example, each advertiser 105 may periodically provide batched or unbatched advertisement data in an electronic feed to the receiver module 139.

In block 210, an advertisement module 135 of the advertisement distribution system 135 generates advertisement creatives (or updated existing advertisement creative) having annotations for one or more of the advertisements. In one embodiment, the advertisement module 135 analyzes a landing web page for the advertisement (and optionally additional information sources) to identify certain information for generating an annotation. For example, annotations may be generated for information associated with the advertiser 105, information associated with the product (or other item) being advertised, and/or information associated with a merchant that offers the product. The advertisement module 135 extracts the identified information and generates annotations for the extracted information on advertisement creatives. Block 210 is described in more detail hereinafter, with reference to FIG. 3.

In block 215, the advertisement module 135 generates a microsite for one or more of the advertisements. In one embodiment, the advertisement module 135 analyzes a landing web page for the advertisement (and optionally additional information sources) to identify certain information for generating a microsite. This information may include some or all of the information used to generate the annotations for the advertisement creative. The microsite typically includes more content than an advertisement creative. Thus, additional content may be identified and extracted from the landing page for use in creating the microsite, such as one or more images, product review information, merchant or advertiser review information, a map, and/or additional content associated with the product subject to the advertisement, the advertiser 105, or a merchant that offers the product for sale. The advertisement module 135 generates the microsite using the extracted information and updates (or creates) a link in the advertisement creative to link to the microsite rather than a landing page. For example, advertisement creative typically includes a link to an advertisement microsite for the advertisement. For an existing advertisement creative having such a link, the advertisement module 135 may replace the link to the advertisement landing page with a link to the microsite so that the microsite is presented rather than (or in addition to) the advertisement landing page in response to the advertisement creative being selected. Block 215 is described in more detail hereinafter, with reference to FIG. 4.

In block 220, the advertisement distribution system 131 serves one or more advertisements to the end user network device 150. The advertisement distribution system 131 may serve advertisements in response to a query or in response to a request for advertisements. For example, the advertisement distribution system 131 may include or be associated with an Internet search engine. In response to a query to the search engine, the advertisement distribution system 131 may transmit advertisements to include with results. In another example, the website publisher 140 (or another network device) requests advertisements from the advertisement provider network device 131 to include with a web page publication. The web page publication may be sent to the end user network device 150, for example in response to the end user 150 navigating to a website of the website publisher 140.

After block 220, the method 200 ends. Of course, the advertisement provider 130 can continue to receive advertisements, generate advertisement creatives having annotations, generate advertisement microsites, and serve advertisements.

Figure 3:
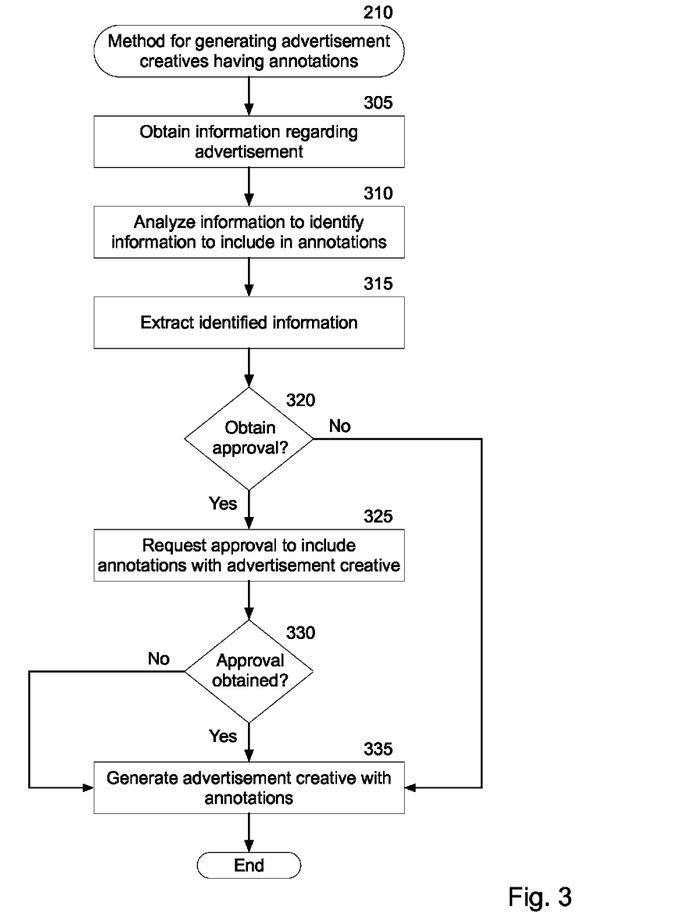
FIG. 3 is a block flow diagram depicting a method for generating an advertisement creative having annotations, in accordance with certain exemplary embodiments.

FIG. 3 is a block flow diagram depicting a method 210 for generating an advertisement creative having annotations, in accordance with certain exemplary embodiments, as referenced in block 210 of the method 200 of FIG. 2.

In block 305, the advertisement module 135 obtains information regarding the advertisement for use in generating annotations for an advertisement creative. As discussed above, annotations can be created for information associated with the advertiser 105, such as a phone number for the advertiser 105, a click-to-call feature that allows an end user to dial the phone number for the advertiser 105 simply by selecting the phone number, and an address for a location of the advertiser 105. The annotations also can include information associated with the product or service subject to the advertisement creative, such as pricing information, product model number, and product review information.

In one embodiment, the advertisement module 135 obtains a landing web page for the advertisement. Advertisement landing pages typically include a substantial amount of information regarding the product or advertiser 105 of the advertisement. The advertisement module 135 also can obtain additional web pages associated with the advertiser 105 and/or the product subject to the advertisement. For example, the advertisement module 135 may obtain web page documents linked by the advertisement landing page. The advertisement module 135 also can access information already stored by the advertisement provider 135, such as advertiser profile information and other advertisements of the advertiser 105.

In certain exemplary embodiments, the advertisement module 135 includes a web crawling mechanism that collects data and content from landing pages for each advertisement stored in the advertisement repository 137. This collected information can be stored in the advertisement repository 137 or another data storage device. The advertisement module 135 also extracts features from the landing pages. For example, these features may include word count, number of tables, number of flash objects, addresses, e-mail addresses, and phone numbers.

In block 310, the advertisement module 135 analyzes the obtained information to identify information to include in the annotations. In one embodiment the advertisement module 135 attempts to identify phone numbers, addresses, pricing information, product images, product videos, model numbers or other product identifiers, such as a Global Trade Item Number ("GTIN"), product/merchant review information, and/or other information that may be useful to display in the form of an annotation of an advertisement creative.

In certain exemplary embodiments, the advertisement module 135 identifies additional information regarding an advertisement or product subject to the advertisement from the landing page for that advertisement and/or additional information, such as other web pages associated with the advertisement or advertiser 105. For example, this information may include information identifying a promotional offer for the product, such as a coupon or discount, that may be included as an annotation. This information may include whether the product is a downloadable product, such as an application, music file, book, or other digital or virtual good. If the product is a downloadable product, the advertisement module 135 may create a click-to-download annotation for the advertisement creative that, when selected, causes the product to be downloaded. The advertisement module 135 may identify general product keywords for use in determining whether the advertisement should be served based on additional keywords beyond what the advertiser 105 has specified explicitly. The advertisement module 135 also may identify information that indicates whether the product is available at local stores and/or whether the landing page is optimized for mobile viewing, for example based on heuristics such as single-page css layout or "m.xyz.com" in the URL for the landing page. The advertisement module 135 also may determine the number of times the product has been "liked" or "+led" (via social annotations, such as those for Facebook) or if the landing page includes social annotations associated with social networking websites. For example, the advertisement module 135 may identify (and extract) the number of "likes" or "+ls" directly from the landing page in question.

When identifying phone numbers and addresses for use in advertisement annotations, care should be taken to ensure that the information is of good quality. For example, it may be frustrating for users to select a phone number of a click-to-call annotation that does not connect to the appropriate advertiser 105 or merchant. For phone numbers, the advertisement module 135 may apply certain restrictions or filters to any identified phone numbers to determine whether to use one of phone numbers in an annotation. For example, the advertisement module 135 may consider toll free numbers such as 800 or 888 numbers for annotations only. In another example, the advertisement module 135 may consider a phone number that is the only phone number present on the landing page for the advertisement or the only phone number found throughout all collected web pages for the advertiser 105 only. The advertisement module 135 may consider the proximity of identified phone numbers to the terms "Contact Us" or consider whether the phone numbers are found on a "Contact Us" web page of the advertiser 105. The advertisement module 135 also may compare the area code of a phone number found on the landing page to an area code for an address found on the landing page and, if there is a match, the advertisement module 135 may determine that the phone number can be used in an annotation.

A similar process can be used for addresses and e-mail addresses. The advertisement module 135 may consider addresses found near the term "Contact Us" or a similar term, or addresses found on a "Contact Us" web page for annotations only. The advertisement module 135 also may determine whether the address is present on each web page of the advertiser 105. It should be understood that other heuristics also can be used to determine with confidence whether identified contact information is correct and is appropriate for use in an annotation.

In block 315, the advertisement module 135 extracts the identified information from the landing page (or other information sources) for use with annotations. In certain exemplary embodiments, each advertiser 105 is provided with the option to approve annotations prior to adding the annotations to the respective advertisement creatives. For example, some advertisers 105 may prefer to opt out of this feature for some or all of their advertisements. In block 320, the advertisement module 135 conducts an inquiry to determine whether approval of the annotation for the advertisement is appropriate. If approval is appropriate, then the method 210 follows the "Yes" branch to block 325. Otherwise, the method 210 follows the "No" branch to block 335.

In block 325, the advertisement module 135 requests approval to add annotations to the advertisement. In one embodiment, the advertisement module 135 transmits a message to the advertiser 105 requesting approval. This message may include an advertisement creative having the annotations and/or a list of content to be included as annotations for an advertisement creative. The advertiser 105 may be given the option to approve or reject all annotations or to select individual annotations to approve or reject.

In block 330, if the advertisement module 135 receives approval from the advertiser 105, the method 210 follows the "Yes" branch to block 335. Otherwise, the method 210 follows the "No" branch and ends.

In block 335, the advertisement module 135 generates an advertisement creative with the annotations. If approval for certain annotations was received only, then the approved annotations are included with the advertisement creative. If an advertisement creative was previously created, then the advertisement module 135 may add the annotations to the previously created advertisement creative.

Figure 6:
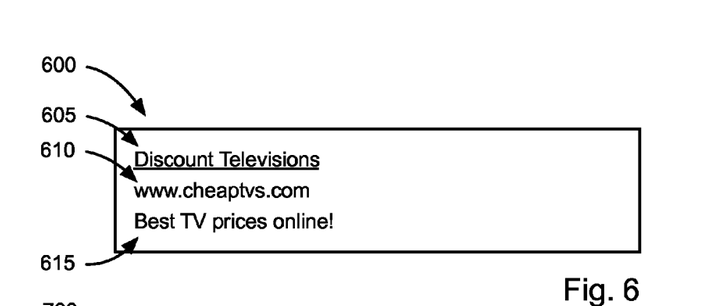
FIG. 6 depicts an advertisement creative, in accordance with certain exemplary embodiments.
Figure 7:
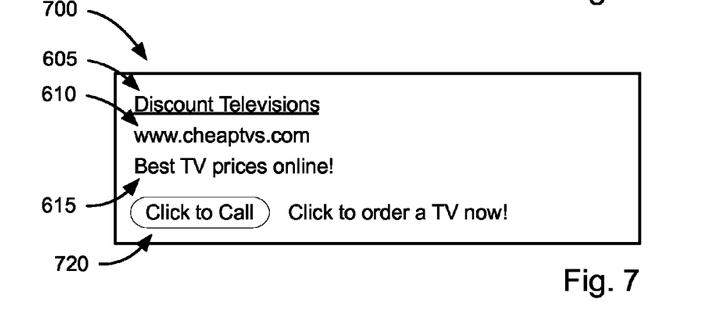
FIG. 7 depicts an advertisement creative having an annotation, in accordance with certain exemplary embodiments.

FIG. 6 depicts an advertisement creative 600, in accordance with certain exemplary embodiments. Referring to FIG. 6, the advertisement creative 600 includes an advertiser or merchant name 605, a URL to a website of the advertiser 105, and descriptive content 615. This exemplary advertisement creative 600 may be served in response to a query for televisions. FIG. 7 depicts an advertisement creative 700 having an annotation 720, in accordance with certain exemplary embodiments. In particular, the exemplary advertisement creative 700 is a version of the advertisement creative 600 of FIG. 6 having a click-to-call annotation 720. As discussed above, the advertisement module 135 can identify a phone number for the advertiser 105 and generate a click-tocall annotation 720 that dials the phone number in response to the click-to-call annotation 720 being selected by an end user 150.

Figure 4:
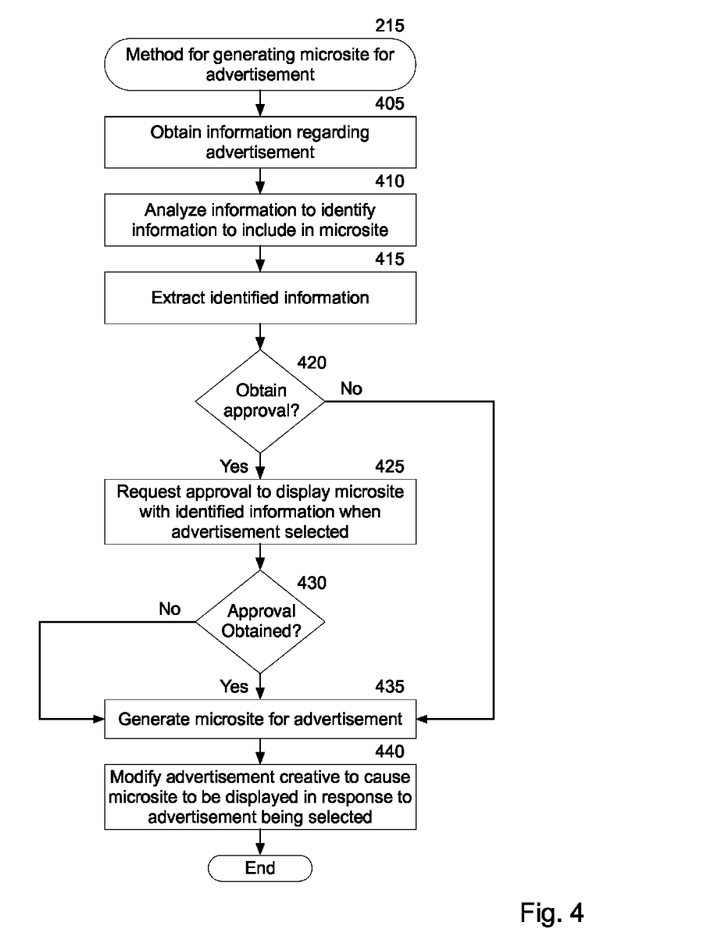
FIG. 4 is a block flow diagram depicting a method for generating a microsite for an advertisement, in accordance with certain exemplary embodiments.

FIG. 4 is a block flow diagram depicting a method 215 for generating a microsite for an advertisement, in accordance with certain exemplary embodiments, as referenced in block 215 of the method 200 of FIG. 2. As discussed above, the microsite may be a web page document that is less data intensive than a typical landing page document.

In block 405, the advertisement module 135 obtains content associated with the advertisement for use in generating a microsite for the advertisement. The microsite typically includes additional content (in addition to the content displayed by an advertisement creative) for the user to review before determining whether to proceed to the advertisement's landing page. This additional content can include, among other things, an image of a product subject to the advertisement, a product description, a promotional offer, product or merchant review or rating information, a map displaying a location associated with the advertiser 105 or merchant that sells a product of the advertiser 105, or contact information, such as an e-mail address, phone number, or physical or mailing address. Generally, the information presented by the microsite enables the end user 150 to decide whether to download and view the advertisement's landing page. The microsite also can include annotations and/or other content displayed in the advertisement creative for the advertisement.

The information sources used to obtain the content for the microsite can be the same or substantially similar to the information sources used for obtaining the information used to create the annotations. That is, advertisement landing pages and other web page documents associated with the advertiser 105 or the product subject to the advertisement may be used to obtain content for the microsite. Thus, the acts of block 405 of the method 215 of FIG. 4 and block 305 of the method 210 of FIG. 3 may be performed a single time to support the generation of the annotations and the microsite for an advertisement.

In block 410, the advertisement module 135 analyzes the obtained information to identify information to include in the microsite. For example, the advertisement module 135 may attempt to identify phone numbers, addresses, pricing information, model numbers or other product identifiers, product or merchant review information, one or more product images, one or more product videos, or any other content that the advertisement provider 130 desires to include with the microsite. If the acts of blocks 310-315 of the method 210 of FIG. 3 have previously been executed, then some of the content may already have been extracted and stored by the advertisement distribution system 131. Additionally, the information discussed above in connection with block 310 of the method 210 of FIG. 3 can be used to create the advertisement microsite.

In block 415, the advertisement module 135 extracts the identified information from the landing page (and other information sources) for use with the microsite. In certain exemplary embodiments, each advertiser 105 is provided with the option to approve the addition of a microsite or content to include with the microsite prior to generating the microsite. In block 420, the advertisement module 135 conducts an inquiry to determine whether approval of the microsite for the advertisement is appropriate. If approval is appropriate, then the method 215 follows the "Yes" branch to block 425. Otherwise, the method 215 follows the "No" branch to block 435.

In block 425, the advertisement module 135 requests approval to link the microsite to the advertisement creative for the advertisement. In one embodiment, the advertisement module 135 transmits a message to the advertiser 105 requesting approval. This message may include a copy of the microsite for the advertiser 105 to review and approve. In such cases, the acts of block 435 may be performed prior to block 425.

In block 430, if the advertisement module 135 receives approval from the advertiser 105, the method 215 follows the "Yes" branch to block 435. Otherwise, the method 215 follows the "No" branch and ends.

In block 435, the advertisement module 135 generates a microsite for the advertisement using the extracted content. For example, the advertisement module 135 may generate a web page document having the extracted content. The advertisement module 135 may populate a template, such as an HTML or an Extensible Markup Language ("XML") template, with the extracted content. The advertisement module 135 may select an appropriate template based on the types of content found on the advertiser's 105 landing page. For example, if the advertisement module 135 was unable to identify with confidence a phone number for the advertiser, a template having a click-to-call annotation may not be selected for the advertisement.

In block 440, the advertisement module 135 modifies (or generates) an advertisement creative for the advertisement to cause the microsite to be displayed in response to a user selecting the advertisement creative. For example, a URL of the advertisement that links to the advertisement landing page may be replaced with a URL that links to the microsite. After block 440, the method 215 ends.

Figure 8:
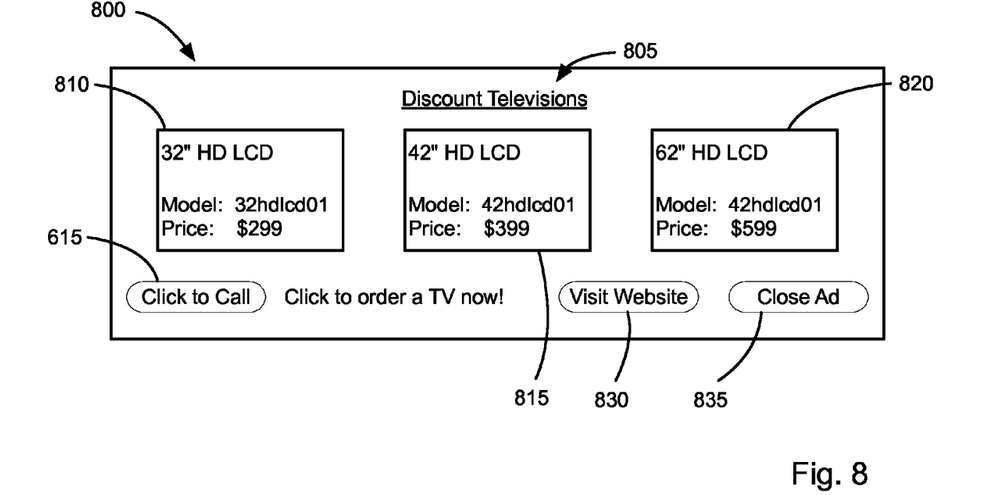
FIG. 8 depicts a microsite, in accordance with certain exemplary embodiments.

FIG. 8 depicts a microsite 800, in accordance with certain exemplary embodiments. In particular, the microsite 800 is an exemplary microsite for the advertisement creatives 600 and 700 depicted in FIGS. 6 and 7, respectively. The exemplary microsite 800 includes an advertiser or merchant name 805, information regarding several products 810-820 offered by the advertiser 105, and a click-to-call annotation 615. The microsite 800 also includes a "Visit Website" icon 830 that links to the landing page of the advertiser 105 that, when selected, caused the landing page to be presented. The microsite 800 also includes a "Close Ad" icon 835 that, when selected, causes the microsite 800 to close or the browser application module 153 to navigate back to a web page that displayed the advertisement creative linked to the microsite 800.

Figure 5:
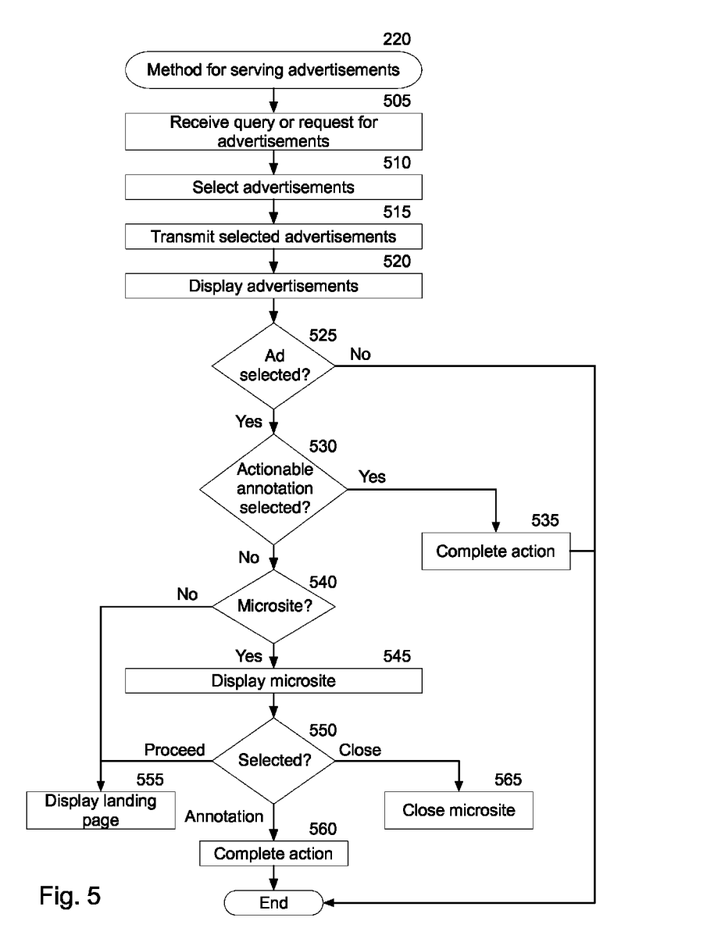
FIG. 5 is a block flow diagram depicting a method for serving advertisements, in accordance with certain exemplary embodiments.

FIG. 5 is a block flow diagram depicting a method 220 for serving advertisements, in accordance with certain exemplary embodiments, as referenced in block 220 of the method 200 of FIG. 2.

In block 505, the advertisement provider network device 130 receives a query or request for an advertisement. As discussed above, the advertisement network device 130 may include or be associated with an Internet search engine. The advertisement network device 130 can receive the query from the end user network device 150 and provide the query to the Internet search engine. Or, the advertisement network device 130 can receive the query from the Internet search engine.

The advertisement provider network device 130 also can receive an advertisement request from the website publisher network device 140 or another network device, such as an application provider. For example, a gaming application provider that provides and facilitates an online game may request advertisements and transmit the advertisements to the end user network device 150 for display while the gaming application is executing. A request for advertisements can include a number of advertisements requested, information regarding the context in which the advertisements will be displayed, such as content of a web page document or application, demographic information of an end user receiving the advertisement, and/or other suitable information for use in selecting advertisements.

In block 510, a selection engine 133 of the advertisement distribution system 131 selects one or more advertisements from the advertisement repository 137 to transmit in response to the query or request. The selection engine 133 may use terms of the query, information regarding past queries of the end user 150 submitting the query, advertisement performance information, advertisement bid information, criteria for serving the advertisements, and/or information included with a request for advertisements to select appropriate advertisements. Other advertisement selection criteria or methods known to those of ordinary skill in the art having the benefit of the present disclosure also can be used by the selection engine 133 to select advertisements.

In block 515, the advertisement provider network device 130 transmits advertisement creatives for the selected advertisements. If the advertisement creatives are being transmitted in response to a query, the advertisement provider network device 130 transmits the selected advertisements to the end user network device 150, for example directly or via an Internet search engine. If the advertisement creatives are being transmitted in response to a request, then the advertisement provider network device 130 transmits the selected advertisement creatives to a network device of the requester. The requester then transmits the advertisements to the end user network device 150.

In block 520, the end user network device 150 presents the advertisement creatives to the end user operating the end user network device 150. For example, the advertisement creatives may be displayed by the browser application module 153 or another application executing on the end user network device 150.

In block 525, the application displaying the advertisements monitors for a selection of one of the advertisement creatives and, if one of the advertisement creatives is selected, the method 220 follows the "Yes" branch to block 530. Otherwise, the method 220 follows the "No" branch and ends. Of course, the application displaying the advertisement creatives can remain active and monitoring for an advertisement selection or another command from the end user 150.

In block 530, if the end user 150 selected an actionable annotation of the advertisement creative, such as a click-to-call annotation, then the method 220 follows the "Yes" branch to block 535 where the selected action is completed. For example, if a click-to-call annotation displayed on a smartphone was selected, the application displaying the advertisement creatives may cause the smartphone to dial a phone number associated with the click-to-call annotation. If the end user did not select an actionable annotation, the method 220 follows to "No" branch to block 540.

In block 540, the application displaying the advertisement creatives evaluates the link of the selected advertisement and causes a document associated with the link to download. If the document is a microsite web page document, the method 220 follows the "Yes" branch to block 545. If the document is a landing page web page document, the method 220 follows the "No" branch to block 555.

In block 545, the microsite is displayed to the end user operating the end user network device 150. If the browser application module 153 is displaying the advertisements, the browser application module 153 may navigate to the microsite, cause a microsite pop-up window to appear, or cause the selected advertisement creative to expand into the microsite over the current web page. Other types of application modules typically cause the browser application module 153 to display the microsite, for example via a pop-up window.

In the embodiment of FIG. 5, the displayed microsite includes a button or icon to proceed to the advertisement landing page and a button or icon to close microsite without proceeding to advertisement landing page. The microsite also may include actionable annotations, such as a click-to-call annotation. In block 550, the browser application module 153 displaying the microsite monitors for a selection from the user. If the browser application module 153 determines that the button or icon to proceed to the advertisement landing page was selected, the method 220 follows the "Proceed" branch to block 555. If the browser application module 153 determines that the button or icon to close the microsite was selected, the method 220 follows the "Close" branch to block 565. If the browser application module 153 determines that an actionable annotation was selected, the method 220 follows the "Annotation" branch to block 560 where the action is completed.

In block 555, the browser application module 153 downloads, for example from the respective advertiser 105, and displays the advertisement landing page for the selected advertisement creative. In certain exemplary embodiments, the browser application module 153 downloads the advertisement landing page while the microsite is being displayed so that the advertisement landing page may be displayed more quickly.

In certain exemplary embodiments, the advertisement landing page is displayed automatically upon completion of the download of the advertisement landing page. For example, in response to a user selecting an advertisement, a microsite for the advertisement may be presented to the user. This microsite may serve as an intermediate page while the advertisement landing page is downloaded. Once the advertisement landing page is downloaded and ready to be presented, the advertisement landing page may be presented in place of the microsite.

In block 565, in response to the end user 150 selecting to close the microsite without proceeding to the advertisement landing page, the browser application module 153 closes the microsite. If the browser application module navigated from a web page that displayed the advertisements to the microsite, the browser application module 153 may return to that web page. After blocks 555, 560, or 565, the method 220 ends. Of course, the end user 150 may select other advertisements and/or receive additional advertisements in response to a query or request.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD- ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for presenting advertisement content, comprising:
    obtaining, by one or more computing devices, an advertisement, the advertisement comprising a landing page link that causes a landing page associated with the advertisement to be presented upon selection of the advertisement, the landing page comprising content related to the advertisement;
    extracting, by the one or more computing devices, information from the content of the landing page that is less than a full content of the landing page;
    creating, by the one or more computing devices, a microsite for the advertisement, the microsite comprising the information extracted from the content of the landing page;
    modifying, by the one or more computing devices, the landing page link such that selection of the advertisement causes the microsite to be presented instead of the landing page;
    transmitting, by the one or more computing devices, the advertisement for presentation on a user computing device;
    receiving, by the one or more computing devices, an indication that the advertisement transmitted for presentation on the user computing device has been selected; and
    transmitting, by the one or more computing devices, the microsite for presentation on the user computing device in response to receiving the indication that the advertisement has been selected.

2. The computer-implemented method of claim 1, wherein the microsite is a web page.

3. The computer-implemented method of claim 1, wherein the microsite comprises less data than the landing page.

4. The computer-implemented method of claim 1, wherein the microsite comprises a secondary link to the landing page that, when selected, causes the landing page to be presented.

5. The computer-implemented method of claim 4, further comprising:
    receiving an indication that the secondary link to the landing page has been selected; and
    transmitting the landing page for presentation in response to receiving the indication that the secondary link to the landing page has been selected.

6. The computer-implemented method of claim 4, further comprising initiating a download of the landing page after transmitting the microsite for presentation and prior to receiving the indication that the secondary link to the landing page has been selected.

7. The computer-implemented method of claim 4, further comprising automatically causing the landing page to be presented after transmitting the microsite for presentation and prior to receiving the indication that the secondary link to the landing page has been selected.

8. The computer-implemented method of claim 1, wherein the microsite comprises a click-to-call annotation operable to cause a phone to dial a phone number associated with the advertisement, the phone number being extracted from the content of the landing page.

9. The computer-implemented method of claim 1, wherein the extracted information comprises one or more of an image of a product, pricing information, a promotional offer, merchant contact information, a product identifier, a product review, and a merchant review.

10. A computer program product, comprising:
    a non-transitory computer-readable medium having computer-readable program code embodied therein that when executed by a computer cause the computer to present advertisement content, the computer-readable program code comprising:
        computer-readable program code for modifying a landing page link associated with an advertisement such that selection of the advertisement causes an advertisement microsite to be presented instead of a landing page associated with the advertisement;
        computer-readable program code for communicating the advertisement for presentment on a computing device operated by a user;
        computer-readable program code for receiving an indication that the advertisement has been selected by the user; and
        computer-readable program code for transmitting the advertisement microsite for presentation on the computing device operated by the user in response to receiving the indication that the advertisement was selected by the user, the advertisement microsite comprising information extracted from content related to the advertisement on the landing page that is less than a full content of the landing page.

11. The computer program product of claim 10, wherein the advertisement microsite comprises a web page document, and wherein the advertisement comprises a Uniform Resource Locator ("URL") for the advertisement microsite web page document.

12. The computer program product of claim 10, wherein the advertisement microsite comprises less data than the advertisement landing page.

13. The computer program product of claim 10, wherein the advertisement microsite comprises a link to the advertisement landing page that, when selected, causes presentation of the advertisement landing page.

14. The computer program product of claim 13, further comprising:
    computer-readable program code for receiving an indication that the link to the advertisement landing page has been selected; and
    computer-readable program code for transmitting the advertisement landing page for presentation in response to receiving the indication that the link to the advertisement landing page has been selected.

15. The computer program product of claim 13, further comprising computer-readable program code for initiating a download of the advertisement landing page after transmitting the advertisement microsite for presentation and prior to receiving the indication that the link to the advertisement landing page has been selected.

16. The computer program product of claim 10, wherein the advertisement microsite comprises a click-to-call annotation operable to cause a phone to dial a phone number associated with the advertisement, the phone number being extracted from the advertisement landing page.

17. The computer program product of claim 10, further comprising:
   computer-readable program code for extracting the information from the content of the advertisement landing page; and
   computer-readable program code for generating the advertisement microsite using the information extracted from the content of the landing page.

18. A system for presenting advertisement content, comprising:
   a storage device;
   a processor communicatively coupled to the storage device, wherein the processor executes application code instructions that are stored in the storage device and that cause the system to:
      extract information from content of a landing page associated with an advertisement that is less than a full content of the landing page, wherein the advertisement comprises a landing page link that causes the landing page to presented upon selection of the advertisement;
      create a microsite for the advertisement, the microsite comprising the information extracted from the content of the landing page;
      modify the landing page link such that selection of the advertisement causes the microsite to be presented instead of the landing page; and
      transmit the advertisement for presentation on a computing device operated by a user, wherein selection of the advertisement by the user causes the microsite to be presented.

19. The system of claim 18, wherein the microsite is a web page.

20. The system of claim 18, wherein the microsite comprises less data than the landing page.

21. The system of claim 18, wherein the microsite comprises a secondary link to the landing page that, when selected, causes the landing page to be presented.

22. The system of claim 21, wherein the processor is further configured to execute computer-executable instructions stored in the storage medium to cause the system to:
   receive an indication that the secondary link to the landing page has been selected; and
   transmit the landing page for presentation in response to receiving the indication that the secondary link to the landing page has been selected.

23. The system of claim 21, wherein the processor is further configured to execute computer-executable instructions stored in the storage medium to cause the system to initiate a download of the landing page after transmitting the microsite for presentation and prior to receiving the indication that the secondary link to the landing page has been selected.

24. The system of claim 21, wherein the processor is further configured to execute computer-executable instructions stored in the storage medium to cause the system to automatically cause the landing page to be presented after transmitting the microsite for presentation and prior to receiving the indication that the secondary link to the landing page has been selected.

25. The system of claim 18, wherein the microsite comprises a click-to-call annotation operable to cause a phone to dial a phone number associated with the advertisement, the phone number being extracted from the content of the landing page.

* * * * *